Nov. 24, 1959 — A. FROHLICH ET AL — 2,913,765
HINGED INNER BEAD FORMING AND SEALING RING FOR VULCANIZING PRESSES
Filed Feb. 15, 1956 — 3 Sheets-Sheet 1

INVENTORS,
ADOLF FRÖHLICH,
EDWARD J. HARRIS
BY
ATTORNEY

INVENTORS,
ADOLF FRÖHLICH,
EDWARD J. HARRIS
BY
ATTORNEY

United States Patent Office 2,913,765
Patented Nov. 24, 1959

2,913,765

HINGED INNER BEAD FORMING AND SEALING RING FOR VULCANIZING PRESSES

Adolf Frohlich and Edward J. Harris, Akron, Ohio, assignors to The Cleveland Trust Company, Cleveland, Ohio, as trustee Application February 15, 1956, Serial No. 565,721

13 Claims. (Cl. 18—17)

This invention relates to the art of pneumatic tire vulcanization, and in particular has reference to a new and improved type of inner bead forming and sealing ring capable of utilization in the vulcanizing operation of pneumatic tire construction.

In the past, the manufacture of pneumatic tires has been effectuated by first forming a plurality of fabric plies in flat form so as to build up a plurality of such layers in what is conventionally referred to as a "flat-built" tire. This "flat-built" tire is then positioned in a vulcanizing press where the same is shaped to a toroidal configuration by the use of a pneumatic former that is automatically positioned interiorly of the tire during the vulcanizing operation.

While the above type of structure has been generally accepted, the same has been found disadvantageous in that it requires the use of a relatively complex mechanism to effectuate the timed entrance and withdrawal of the pneumatic former. Additionally, such formers have been found to have a relatively short duration of use and must be accordingly replaced frequently to thus add to the overall cost of manufacturing with an attendant increase in the cost of the overall tire per se.

It has been proposed in the past to vulcanize pneumatic tires without the use of a pneumatic former of the type above described. However, such efforts have been unsatisfactory in view of the fact that it was heretofore impossible to provide an efficient type of inner bead forming ring mechanism that would serve the dual purpose of creating an air-tight seal at the bead area of the tire being cured, while simultaneously being easy to install and remove prior to and after the vulcanizing cycle.

With specific reference to the problem of creating an air-tight seal in the internal bead walls, it has been conventional practice in the past to make an annular ring of fixed radial and axial dimensions that is positioned between the tire beads upon closure of the mold sections. Because of the fixed axial dimension of such rings, it becomes apparent that the same are not able to automatically compensate for any variation in spacing that exists between the spaced bead walls after the same have been formed. Thus if the cross-sectional diameter of these bead sections has been made undersize during the tire building operation, it is apparent that the fixed diameter ring will not be able to axially expand to seal off the void that occurs in such cases. In contrast, if said bead sections are made oversize it becomes apparent that extreme pressure will be exerted upon the same, with the result that deformation will occur to the detriment of the ultimate product.

In addition to this disadvantage, present day sealing rings of this type are impractical due to the fact that the same are provided with a fixed radial dimension. Because the extreme periphery of such rings must be received interiorly of the bead portion of the formed tire T, it is apparent that sealing rings of this type are in reality, oversize with respect to the diameter of the bead portions, and accordingly, the same must be hand-placed inside of the tire. It follows that during such placement operation, the tire must be somewhat deformed to permit passage of the ring therethrough, due to the fact that the ring diameter is greater than the bead diameter. It is believed apparent that although inconvenient this type of ring may be utilized in smaller size tires such as passenger tires. However, when larger size tires having a greater number of fabric plies are encountered as in the case of manufacturing truck tires, for example, then the manual positioning of the ring becomes virtually impossible, with the result that the positioning and removal thereof must be done by automatic equipment of an expensive and complex nature.

In co-pending application of Adolf Frohlich and Edward J. Harris, for Expandable Bead Ring For Vulcanizing Presses, Serial No. 530,381, filed August 24, 1955, there was disclosed an improved type of bead ring that overcame the objections above set forth, in view of the fact that the same had the radial dimension thereof expandable so that the overall ring could be contracted during the mounting of the tire on the vulcanizing press, and then could be expanded radially for effectuating the requisite seal between the beads.

While the subject matter of the above referred to co-pending application has been found satisfactory in general, it is found that the same does not in all cases, completely overcome the bead sealing disadvantage discussed above, in view of the fact that the improved ring of the co-pending application does not have any provision therein for making the opposed bead sealing faces axially shiftable with respect to each other.

It accordingly becomes a principal object of this invention to provide an improved type of bead ring sealing mechanism for use in bagless vulcanizing presses that is characterized by the fact that the bead ring is capable of expanding and contracting both radially and axially in its overall dimensions to thus facilitate ease in removal and insertion of the same with respect to the pneumatic tire being vulcanized.

It is a further object of this invention to provide an improved type of vulcanizing press having as an integral part thereof a bead ring that is radially and axially expansible with said radial and axial expansion thereof automatically occurring upon closing movement of the vulcanizing press.

These and other objects of the invention will become more apparent upon a reading of the following brief specification, considered and interpreted in the light of the accompanying drawings.

Figure 1:
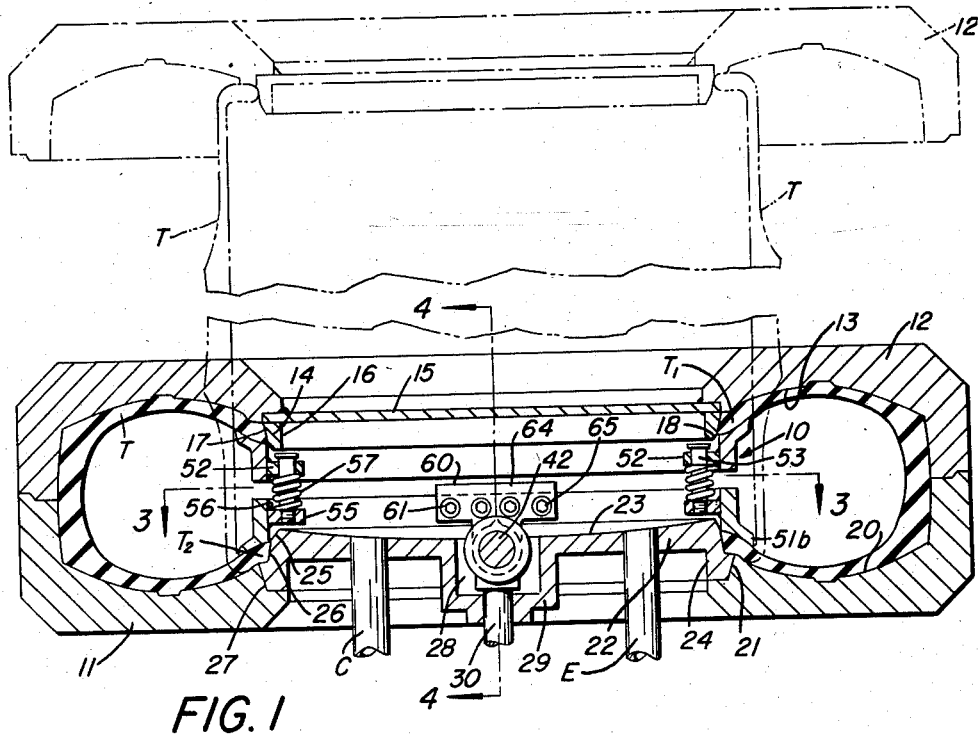
Figure 1 is a sectional view of the improved sealing ring, with the position of the component parts in closed position being shown in full lines, and the open position thereof being illustrated in chain-dotted lines.
Figure 2:
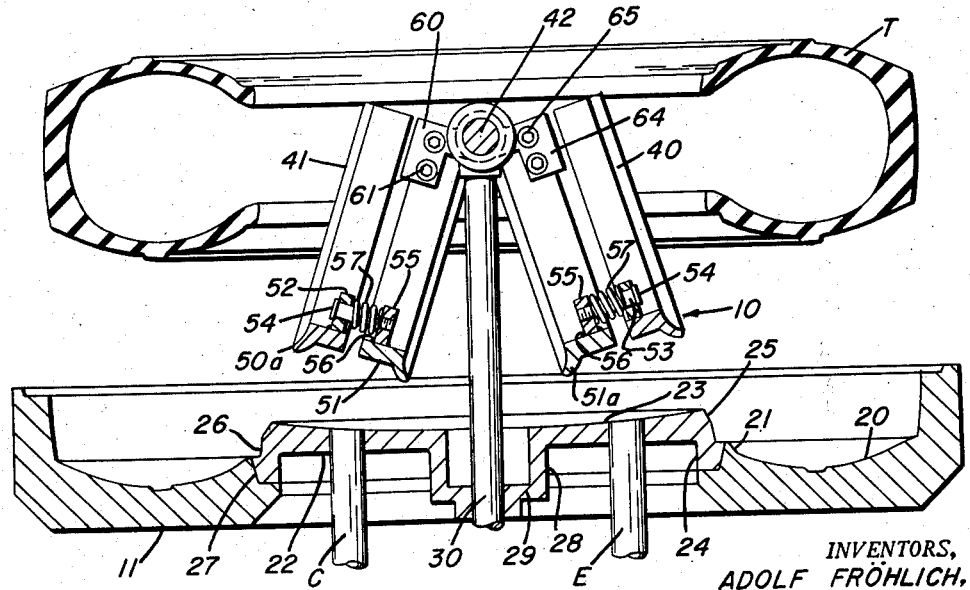
Figure 2 is a similar view to Figure 1, but showing the position of the component parts after the mold sections have been opened after vulcanization.

Referring now to the drawings, and in particular to Figures 1 and 2 thereof, the improved bead ring, generally designated by the numeral 10, is shown as being carried by a lower mold section 11 so as to coact with certain component parts of an upper mold section 12 to accordingly effectuate a vulcanization of an uncured pneumatic tire T that is deformed to toroidal shape upon closing of the mold sections 11 and 12, as will presently be described. In Figure 1, the mold sections 11 and 12, together with tire T are shown in two positions with the chain-dotted line illustrations thereof indicating the position of these parts prior to closure of the press, and the full line positions illustrating their position after closure and during vulcanization.

Considering first the structure of the mold section 12, it will be seen that the same includes the usual design-imparting cavity 13 that defines adjacent the bead portion thereof a circular seat 14, within which may be received a plate member designated by the numeral 15. The plate member 15 includes the flat central portion that seals off the central opening of the mold section 12, and further includes a peripheral flange 16 that has tapered peripheral surfaces 17 and 18 that coact with certain component parts of the ring member 10, as will be presently described.

Considering next the structure of the lower mold section 11, it will be seen that the same includes a design-imparting surface 20 that defines adjacent the bead area thereof, a circular seat 21, within which a plate 22 may be received. As is best shown in Figures 1 and 2 of the drawings, the plate 22 is of generally cylindrical configuration and has the top face 23 thereof (see Figures 1 and 2) dished in concave form, while the peripheral edge thereof is defined by a flange 24 that has the extreme peripheral edge portions defined by surfaces 25, 26, and 27; the arrangement being such that the surface 25 coacts with the ring 10 as will be described, while the surface 26 serves as a seat for the bead portion $T_2$, with the surface 27 being complementally received against the undercut 21 as shown in Figure 2 of the drawings. In addition to the aforementioned component parts, the plate 23 further includes a centrally located depending trough member 28 that extends transversely thereof and which has the horizontal base portion 29 apertured so as to receive a shaft 30, upon which the ring 10 is mounted, as will be described.

Turning now to the construction of the ring 10 per se, it will be seen that the same is generally defined by a pair of semi-circular forming elements that are generally indicated by the numerals 40 and 41 and which are pivotally mounted about a central shaft 42 so as to be pivoted between the positions of Figures 1 and 2 upon axial shifting of the shaft 30 which may be axially moved by known means capable of use in this regard, with a hydraulic piston (not shown) being satisfactory for use in this regard.

Figure 4:
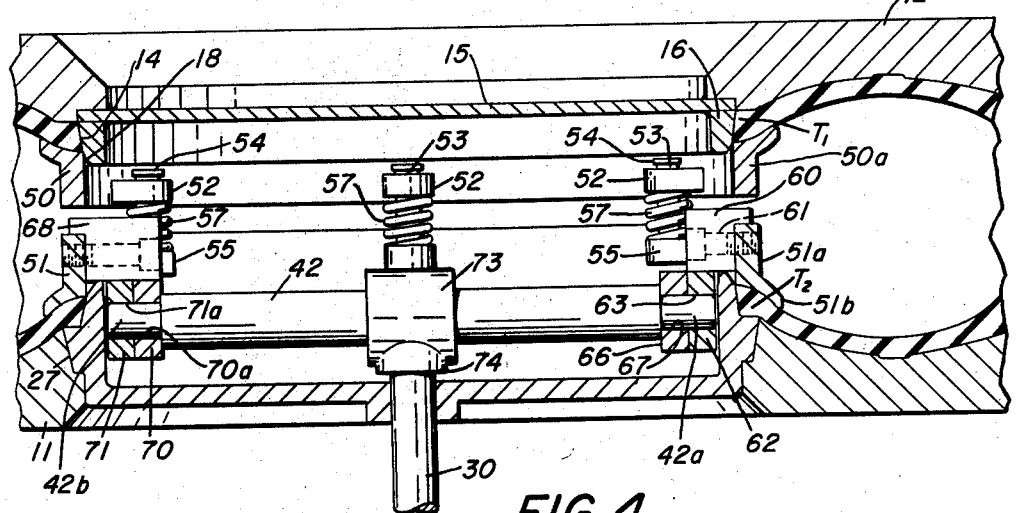
Figure 4 is a sectional view taken on the lines 4—4 of Figure 1.

As is best shown in Figure 4, the ring section 40 is defined by a pair of axially spaced semi-circular rings 50 and 51, while the semi-circular ring unit 41 is defined by axially spaced semi-circular rings 50a and 51a. To the end of making the just-described individual semi-circular ring segments axially shiftable with respect to each other, the ring members 50 and 50a are shown provided with a series of radial bosses 52, 52, within which may be received pin members 53, 53; each having a head portion 54. The opposed ends of the pin members 53, 53 are shown threaded into axially aligned radial lugs 55, 55 that are welded as at 56, to the lowermost ring members 51 and 51a. In this manner, springs 57, 57 will urge the flanges 52, 52 and 55, 55 apart, with the head 54 limiting the extent of such axial movement. Such a condition is shown clearly in Figure 1 of the drawings.

Figure 3:
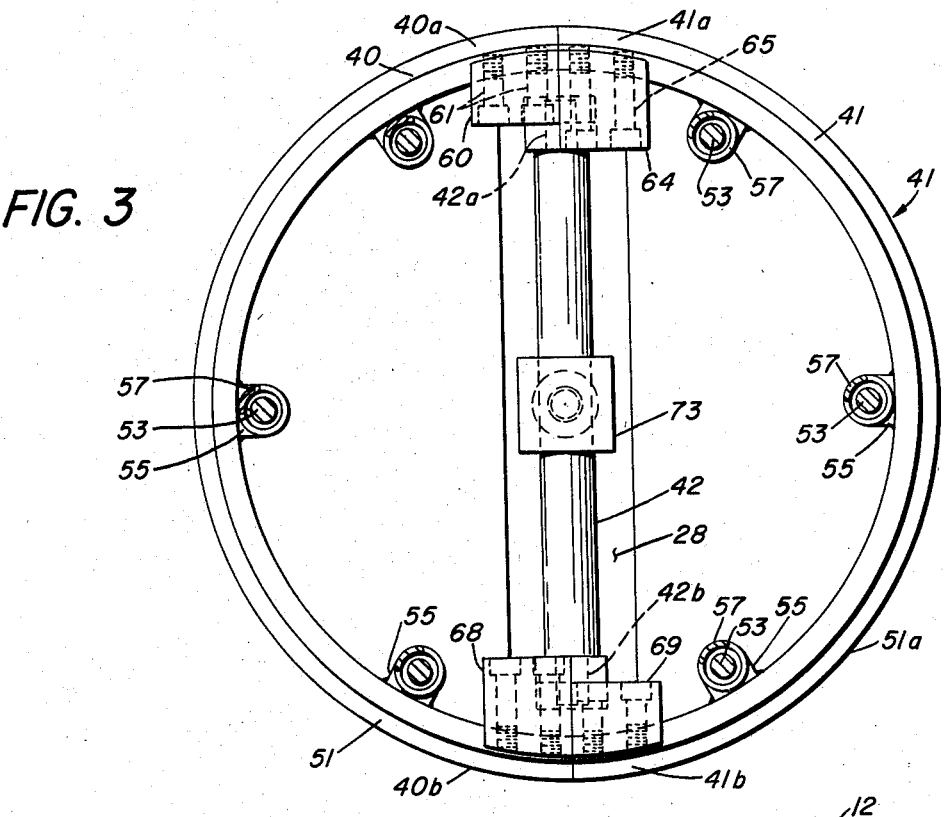
Figure 3 is a sectional view taken on the lines 3—3 of Figure 1.

To the end of pivotally mounting the overall ring segments 40 and 41 in a pivotal relationship about the shaft 42, the arcuate end 40a of the ring member 40 is provided with a bracket member 60 that is secured by bolts 61, 61 to the lower ring segments 51, as is best shown in Figure 4 of the drawings. This mounting bracket 60 further includes a depending bearing plate 62 that is apertured as at 63 so as to permit reception therein of the reduced diameter end 42a of shaft 42. A similar bracket 64, differing slightly in shape, is shown mounted on the ring member 51a adjacent the arcuate end 41a of the ring segment 41, with bolts 65, 65 being utilized for attachment of the bracket 64. Additionally, the bracket 64 includes a depending flange 66 having a central aperture 67 that is received about the reduced diameter 42a of shaft 42, as best shown in Figure 4 of the drawings. Similar brackets 68 and 69 are attached to the individual plates 51, 51a adjacent the opposed arcuate ends 40b and 41b of ring segments 40 and 41, respectively, with the bracket 68 having a depending flange 70, and the bracket 69 having a depending support plate 71; both of which are provided with concentric apertures 70a and 71a for reception of the reduced portion 42b of shaft 42. In this manner, it is believed apparent that the brackets 60, 64, 68 and 69, together with the ring members to which the same are attached, will be capable of relative rotational movement with respect to the shaft 42. To the end of facilitating such movement, the shaft 42 is shown in Figures 3 and 4 as receiving about its central portion a collar 73 that has a boss portion 74 thereof receiving the uppermost axial end of the shaft member 30.

In use or operation of the improved sealing ring 10, it will first be assumed that the component parts are positioned as shown in chain-dotted lines in Figure 1 of the drawings, with an uncured tire T of flat cylindrical form positioned upon the circular seat 26 of the plate 22. In this regard, it is to be understood that the plate 22 can be moved axially of the lower mold section 11 by merely equipping the same with power means that would operate to shift the same out of the illustrated condition of registry. Such a feature would aid both in mounting prior to vulcanization and stripping the same from the mold after the curing operation has been completed.

Prior to moving upper mold section 12 downwardly from the chain-dotted line position of Figure 1, the ring 10 may have the overall radial width thereof expanded by merely causing a downward movement to occur with respect to the shaft 30; with this movement being initiated by hydraulic or other gear rack mechanisms of known character. As this downward movement commences it is believed apparent that the extreme lower ends 51b, 51b of the ring members 51 and 51a will come in contact with the contoured surface 23; and as downward movement continues these members will slide along the surface 23 towards the position of Figure 2. As the tip portions 51b, 51b are sliding across the contoured surface 23, it is believed apparent that the brackets 60, 64, 68 and 69 will be respectively pivoting around the circular shaft 42; and as a result of this movement it is apparent that as the condition of Figure 1 is approached that the individual rings 51, 51a will be positively centered in concentric relationship to lower mold section 11 as a result of the rings 51 and 51a sliding along the inclined surface 25 which acts in this regard as a centering device. Similarly, the upper rings 50a, 50a will be centered as a result of contact with the inclined surface 18 that is provided on the upper plate 15. At this time, the overall ring sections 40 and 41 will be axially urged apart under tension, by the springs 57, 57, with the result that a gripping force will be applied by these ring members against the internal surfaces of the tire beads $T_1$ and $T_2$.

At this time vulcanizing medium may be introduced through conduit C, with the result that the entire internal circular cavity will be filled with vulcanizing medium to effectuate curing of the tire. During this time exhaust of condensate may be effectuated by provision of the usual flexible hose attached to the end of exhaust line E, for example.

When it is desired to remove the tire after curing, the mold sections 11 and 12 may be slightly separated and after the tire T has been stripped from the upper design-imparting surface 13 and the lower design-imparting surface 20, the ring 10 may be removed by merely moving the shaft 30 upwardly of Figure 1 towards the position of Figure 2. Such movement of the shaft 30 will axially compress the members 40 and 41 to the point where the same will pass through the spaced beads $T_1$ and $T_2$, and hence are automatically removed.

Upon continued movement of the shaft 30 to the position of Figure 2, the upper bead of the wire T will be resting on the ring 10 as shown, and upon removal thereof, another "green" or uncured tire may be positioned on seat 26 for repetition of the above-described cycle.

The modified form of the invention shown in Figure 5 of the drawings is similar in all respects to that previously illustrated and described in connection with Figures 1 through 4 of the drawings, with the single exception that auxiliary means are provided for guiding the collapsing movement of the individual ring segments 40, 41 from the position of Figure 2, for example, to the closed position of Figure 1. Accordingly, where indicated like numerals indicate like parts.

Figure 5:
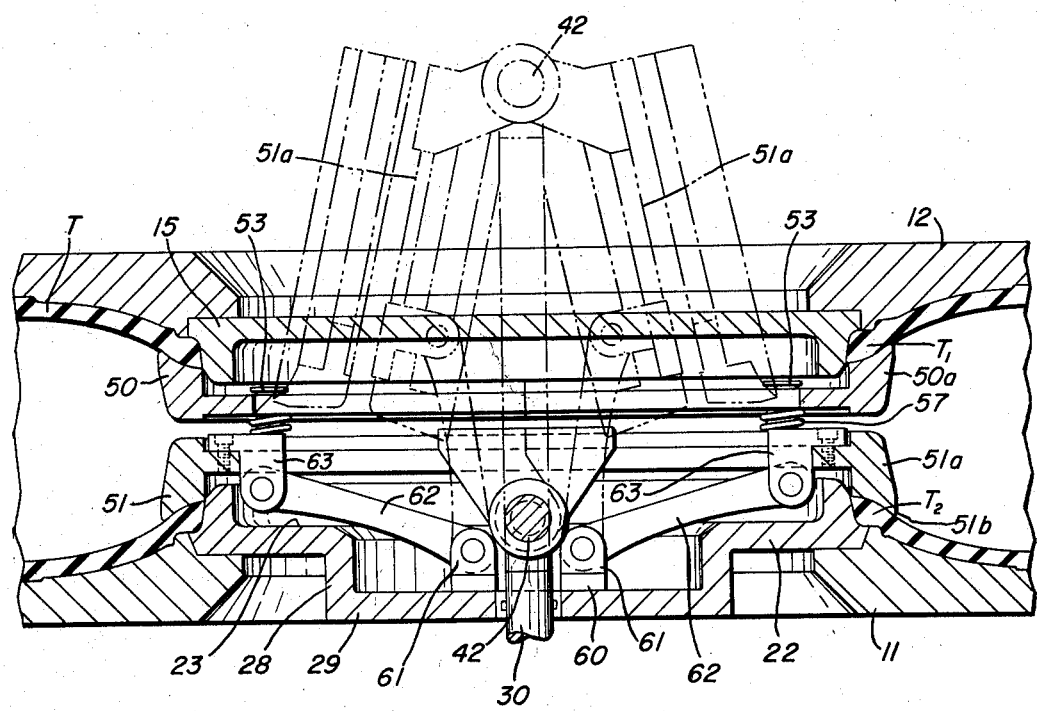
Figure 5 is a view similar to Figure 2, but showing a modified form of the invention.

As shown in Figure 5, the modified form of the invention contemplates the provision of a plate 60 that is carried by lower plate 22 and mounted adjacent the axis of concave surface 23 so as to be relatively movable with respect to the shaft 30. This plate 60 includes a plurality of lug members 61, 61 to which are pivotally secured an equal number of arm members 62, 62; the arrangement being such that the opposed ends of the arm members 62, 62 are pivotally secured to lug members 63, 63 that are provided on the under surface of the rings 51, 51a, as best shown in Figure 5 of the drawings. This arrangement of component parts causes an "umbrella" type of action to occur, with the result that during axial movement of the shaft 30 the individual arm members 62, 62, acting through their pivotal connections, will swing the members 40, 41 through an arcuate path of movement that will permit the same to assume a position similar to that shown in the full line position of Figure 1.

In use or operation of the modified form of the invention, the same is exactly the same in all respects to that previously described in connection with Figures 1 through 4 of the drawings, with the single exception that the arms 62, 62 aid in swinging the semi-circular segments 40 and 41 towards a position similar to that shown in Figure 2.

It will be seen from the foregoing that there has been provided a new and novel type of bead ring for vulcanizing pneumatic tires that is characterized by being collapsible so as to permit easy insertion and withdrawal with respect to a pneumatic tire. It has been shown how the invention permits the timed entrance and withdrawal of the bead ring, and how automatic centering means have been employed to assure concentricity between the bead ring and the respective mold sections.

It is believed apparent that certain modifications could be resorted to, and in this regard, it is to be noted that the individual rings 50 and 51, for example, could be urged apart by means other than the spring means illustrated in this preferred embodiment of the invention. In this regard, the use of hydraulic pistons for this purpose is noted. It is also to be understood that where the term "sealing ring" is used that this includes a ring engageable against the inner bead surface to effectuate a forming action.

It accordingly follows that while a detailed embodiment of the invention has been made in accordance with the patent statutes, that modifications of the invention could be resorted to without departing from the spirit thereof or the scope of the appended claims.

This application is a continuation in part of copending application Serial No. 530,381, of Adolf Frohlich and Edward J. Harris, filed August 24, 1955.

What is claimed is:

1. A vulcanizing press of the character described, comprising; a pair of relatively movable, complemental mold sections; a shaft carried by one said mold section in shiftable relationship therewith bead ring means carried in the end of said shaft and having axially spaced bead engaging surfaces; said ring means including a pair of semi-circular segments hinged at their respective arcuate ends to a common tie member that extends transversely thereof and means for moving said semi-circular segments about their hinge points into and out of coplanar relationship with each other; said bead segments defining a circular bead ring when disposed in coplanar relationship with each other; said last mentioned means being operable upon shifting of said shaft.

2. The device of claim 1 further characterized by the fact that said bead engaging surfaces of said semi-circular segments are axially shiftable with respect to each other.

3. The device of claim 1 further characterized by the fact that said bead engaging surfaces of said semi-circular segments are axially urged apart under tension.

4. A vulcanizing press of the character described, comprising; a pair of relatively movable, complemental mold sections; bead ring means including a pair of semi-circular segments hinged at their respective ends to a common tie member that extends transversely thereof, with each said semi-circular segment having axially spaced bead engaging surfaces; and mounting means carried by one said mold section in axially shiftable relationship therewith and being secured at a free end thereof to said tie member of said bead means, whereby axial movement of said mounting means will result in movement of said segments around the hinge point of connection with said tie member whereby said semi-circular segments are moved into and out of coplanar relationship with each other upon axial movement of said mounting means; said bead segments defining a circular bead ring when disposed in coplanar relationship with each other.

5. The device of claim 4 further characterized by the fact that said bead engaging surfaces are axially shiftable with respect to each other.

6. The device of claim 4 further characterized by the presence of means for urging said bead engaging surfaces axially apart under tension.

7. A vulcanizing press of the character described, comprising; a pair of relatively movable, complemental mold sections; bead ring means including a pair of semi-circular segments hinged at their respective ends to a common tie member that extends transversely thereof, with each said segment having axially spaced bead engaging surfaces; mounting means carried by one said mold section in axially shiftable relationship therewith and being secured at a free end thereof to said tie member of said bead means, whereby axial shifting of said mounting means will result in movement of said semi-circular segments about said tie member into and out of co-planar relationship with each other; and guide means for concentrically locating said bead ring means with respect to said mold sections upon movement of said mounting means.

8. The device of claim 7 further characterized by the fact that said bead engaging surfaces are axially shiftable with respect to each other.

9. The device of claim 7 further characterized by the presence of means for urging said bead engaging surfaces axially apart under tension.

10. A bead ring for use in a vulcanizing press, comprising; a shaft; a first pair of concentrically aligned semi-circular segments maintained in axially spaced apart relationship and having their arcuate ends hinged to said shaft adjacent the opposed axial ends thereof; a second pair of aligned semi-circular segments maintained in axially spaced apart relationship and having their arcuate ends hinged to said shaft adjacent the opposed axial ends thereof; and means for pivoting said first and second pairs of segments into and out of coplanar relationship with each other; said bead rings defining a circular bead ring when disposed in coplanar relationship with each other.

11. A bead ring for use in a vulcanizing press, comprising; a shaft; a first pair of concentrically aligned semi-circular segments maintained in axially spaced apart relationship and having their arcuate ends hinged to said shaft adajcent the opposed axial ends thereof; a second pair of aligned semi-circular segments maintained in axially spaced apart relationship and having their arcuate ends hinged to said shaft adjacent the opposed axial ends thereof; means for pivoting said first and second pairs of segments into and out of coplanar relationship with each other; said bead rings defining a circular bead ring when disposed in coplanar relationship with each other; and means for limiting pivotal movement of said pairs of segments around said shaft.

12. A bead ring for use in a vulcanizing press, comprising; a shaft; a first pair of concentrically aligned semi-circular segments maintained in axially spaced apart relationship and having their arcuate ends hinged to said shaft adjacent the opposed axial ends thereof; a second pair of aligned semi-circular segments maintained in axially spaced apart relationship and having their arcuate ends hinged to said shaft adjacent the opposed axial ends thereof; and means for pivoting said first and second pairs of segments into and out of coplanar relationship with each other; said bead rings defining a circular bead ring when disposed in coplanar relationship with each other, each said segment having a bead-engaging surface.

13. A bead ring for use in a vulcanizing press, comprising; a shaft; a first pair of concentrically aligned semi-circular segments maintained in axially spaced apart relationship and having their arcuate ends hinged to said shaft adjacent the opposed axial ends thereof; a second pair of aligned semi-circular segments maintained in axially spaced apart relationship and having their arcuate ends hinged to said shaft adjacent the opposed axial ends thereof; means for pivoting said first and second pairs of segments into and out of coplanar relationship with each other; said bead rings defining a circular bead ring when disposed in coplanar relationship with each other, each said segment having a bead-engaging surface, and means for urging said bead-engaging surfaces apart under tension.

References Cited in the file of this patent

UNITED STATES PATENTS

| | | |
|---|---|---|
| 1,292,203 | Wolfe | Jan. 21, 1919 |
| 1,366,290 | Smith et al. | Jan. 18, 1921 |
| 1,625,894 | Hutchens et al. | Apr. 26, 1927 |
| 1,757,376 | Laursen | May 6, 1930 |
| 1,895,603 | Brundage | Jan. 31, 1933 |
| 1,952,427 | Evans | Apr. 27, 1934 |
| 2,514,215 | Stevens et al. | July 4, 1950 |
| 2,812,544 | Soderquist | Nov. 12, 1957 |